(12) United States Patent
Agahi-Kesheh et al.

(10) Patent No.: US 6,192,228 B1
(45) Date of Patent: Feb. 20, 2001

(54) METHOD AND APPARATUS FOR IMPROVING THE SENSITIVITY OF AN RF RECEIVER AT CERTAIN FREQUENCIES

(75) Inventors: Darioush Agahi-Kesheh, Irvine; William J. Domino, Yorba Linda; Mark Oskowsky, Newport Coast; Dmitriy Rozenblit, Irvine, all of CA (US)

(73) Assignee: Conexant Systems, Inc., Newport Beach, CA (US)

( * ) Notice: Under 35 U.S.C. 154(b), the term of this patent shall be extended for 0 days.

(21) Appl. No.: 09/153,008

(22) Filed: Sep. 11, 1998

(51) Int. Cl.$^7$ ........................................ H04Q 7/32
(52) U.S. Cl. ................. 455/296; 455/67.3; 455/63; 455/67.1; 455/254; 455/317; 455/318; 455/310; 455/258; 455/259
(58) Field of Search .................. 455/296, 67.3, 455/63, 67.1, 254, 317, 318, 310, 258, 259, 550, 131, 141, 255, 256

(56) References Cited

U.S. PATENT DOCUMENTS 4,653,117 * 3/1987 Heck ..................................... 455/258
5,101,509 * 3/1992 Lai ........................................ 455/254

* cited by examiner

Primary Examiner—Fan Tsang
Assistant Examiner—Keith Ferguson
(74) Attorney, Agent, or Firm—Akin, Gump, Strauss, Hauer & Feld, L.L.P.

(57) ABSTRACT

A method and apparatus for improving the sensitivity of a radio frequency (RF) receiver at certain frequencies suffering from co-channel interference. In the preferred embodiment, when a reference frequency, $F_{REF}$, generates significant harmonics for a received RF signal in a selected channel, the reference frequency is varied or offset by a small amount, $\Delta F$. The harmonics of the offset reference frequency, $F'_{REF}=F_{REF}\pm\Delta F$, are thereby shifted away from the frequency of the received RF signal, thus reducing co-channel interference. The offset amount $\Delta F$ is chosen such that the same injection frequency synthesized from $F_{REF}$ can still be synthesized from $F_{REF}\pm\Delta F$ by shifting N by an integer amount, preferably to N+1 or N−1. However, the invention encompasses shifting N by other integer amounts.

18 Claims, 1 Drawing Sheet

_US 6,192,228 B1_

METHOD AND APPARATUS FOR IMPROVING THE SENSITIVITY OF AN RF RECEIVER AT CERTAIN FREQUENCIES

TECHNICAL FIELD

This invention relates to electronic communication systems, and more particularly to a method and apparatus for improving the sensitivity of a radio frequency (RF) receiver at certain frequencies suffering from co-channel interference.

BACKGROUND

It is well-known that the sensitivity of a frequency modulated radio receiver is significantly degraded on channels where the received frequency is equal to a harmonic frequency of the receiver clock frequency. This problem, known as co-channel interference, is a form of "jamming", and can be understood by reference to FIG. 1. FIG. 1 is a block diagram of a prior art single stage RF receiver that can exhibit the problem solved by the present invention. While a single stage RF receiver is shown, the problem of co-channel interference arises with receivers having multiple stages or direct-to-digital down conversion.

In the example shown, a modulated RF signal 100 having a particular carrier frequency, $F_{RFC}=N \cdot F_{CH}$ (where N is an integer designating, in effect, a channel), is generated in known fashion by a remote RF transmitter and received at an antenna 102 of a compatible receiver. When the audio content of the RF signal 100 is zero (that is, when an audio signal is not present in the received signal). $F_{RFC}$ is constant. Otherwise, $F_{RFC}$ is modulated in a manner which represents the audio content of the transmitted and received RF signal 100. The instantaneous modulated frequency is $F_{RFC}+F_{MOD}$.

The received signal is typically amplified by a low noise amplifier 104 before conversion by a conventional down converter 106 to a baseband frequency (for a single stage down converter) or to an intermediate frequency (which is further down converted by one or more subsequent stages until a baseband frequency is generated).

The other input to the down converter 106 is an "injection" frequency, which is synthesized to have a nominal frequency of $N \cdot F_{CH}$ (where N is an integer designating, in effect, a channel). In the illustrated embodiment, a processor 108 (e.g., a digital signal processor, or DSP) coupled to a clock source 109 (e.g., a crystal) outputs a control voltage having a nominal value of Vo to an oscillator 110, which is preferably a voltage controlled crystal oscillator (VCXO) but may be a voltage controlled oscillator (VCO). Typically, the oscillator 110 outputs a reference frequency $F_{REF}$, which equals k·Vo, where k is a constant. By way of example only, for certain cellular telephone systems (e.g., GSM), $F_{REF}$ may be 13 MHz or 19.5 MHz. This reference frequency is then divided down in a divider 111 by a value R to a channel spacing frequency, $F_{Ch}$. The channel spacing frequency $F_{CH}$ s applied to a multiplier circuit 112 (e.g., a phase-locked loop), which outputs the injection frequency of N·FCH for a particular "channel" mapped to a multiplier value N.

The down converter 106 subtracts the injection frequency $N \cdot F_{CH}$ from the received frequency $F_{RFC}+F_{MOD}$ (which equals $N \cdot F_{CH}+F_{MOD}$) to generate a baseband frequency $F_{MOD}$ representing the audio content of the received signal 100. In the illustrated embodiment, the baseband frequency $F_{MOD}$ is converted to a digital frequency-modulated (FM) waveform by an analog-to-digital converter 114. The processor 108, which generally includes a memory circuit 116 for data and program storage, decodes the FM signal and outputs a digital audio signal. A digital-to-analog converter 118 converts the digital audio signal to an analog audio waveform, which may then be applied to an audio amplifier 120 and thereafter output as sound from a speaker 122.

A problem arises because the output of the oscillator 110 generates harmonics that can interfere with certain received input signals 100. These harmonic frequencies typically are coupled to and amplified by the low noise amplifier 104, and can mask the received signal 100. One known technique for reducing such co-channel interference is to shield the oscillator 110, but such shielding may not achieve the desired sensitivity required for a system.

Accordingly, the inventors have determined that there is a need for an RF receiver with enhanced sensitivity and reduced co-channel interference. The present invention meets this need.

SUMMARY

The invention encompasses a method and apparatus for improving the sensitivity of a radio frequency (RF) receiver at certain frequencies suffering from co-channel interference. In the preferred embodiment of the invention, when a reference frequency, $F_{REF}$, generates significant harmonics for a received RF signal in a selected channel, the reference frequency is varied or offset by a small amount, ΔF. The harmonics of the offset reference frequency, $F'_{REF}=F_{REF}\pm\Delta F$, are thereby shifted away from the frequency of the received RF signal, thus reducing co-channel interference. The offset amount ΔF is chosen such that the same injection frequency synthesized from $F_{REF}$ can still be synthesized from $F_{REF}\pm\Delta F$ by shifting N by an integer amount, preferably to N+1 or N−1. However, the invention encompasses shifting N by other integer amounts.

The details of one or more embodiments of the inventions are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
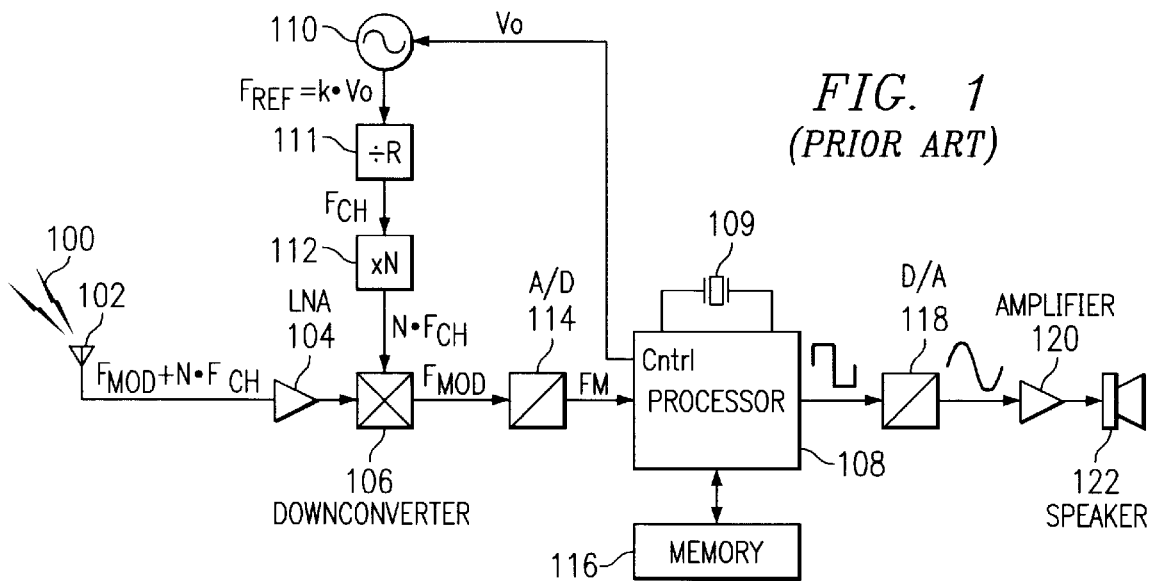
FIG. 1 is a block diagram of a prior art single stage RF receiver that can exhibit the problem solved by the present invention.
Figure 2:
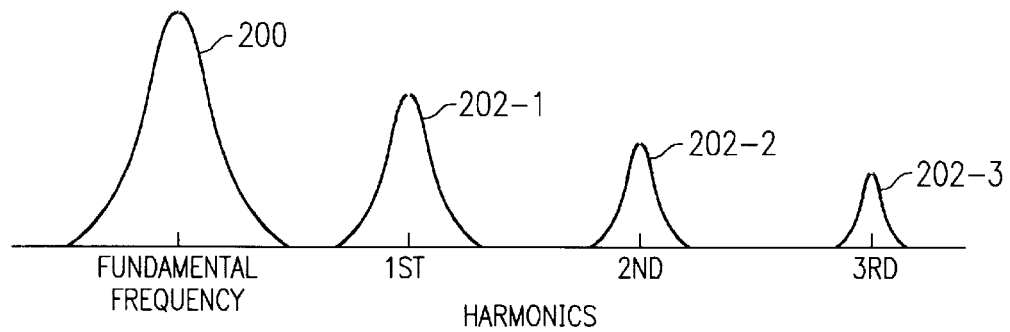
FIG. 2 is a diagram showings the energy content of harmonics of a reference frequency.
Figure 3:
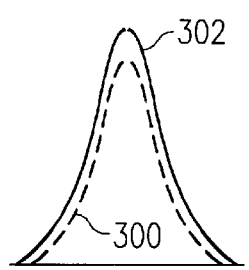
FIG. 3 is a diagram showing a harmonic of a reference frequency causing interference with a received signal having the same center frequency.

FIG. 2 is a diagram showing the energy content of harmonics of a reference frequency. A fundamental frequency 200 generates harmonics 202-1, 202-2, 202-3 at fixed intervals. FIG. 3 is a diagram showing a harmonic 300 of a reference frequency causing interference with a received signal 302 having the same center frequency. In many cases, the harmonic 300 may be stronger than the received signal 302.

Figure 4:
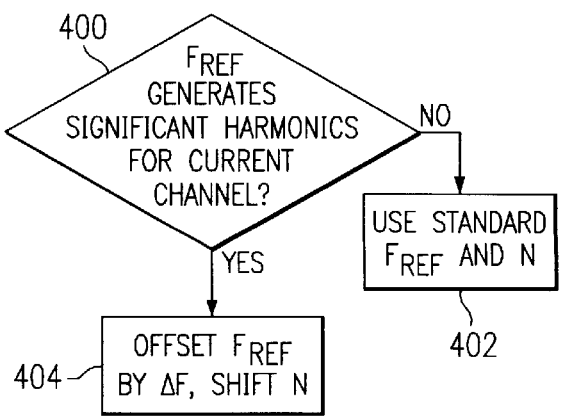
FIG. 4 is a flowchart showing the preferred embodiment of the invention.

FIG. 4 is a flowchart showing the preferred embodiment of the invention. In this embodiment, a determination is made as to whether a reference frequency, $F_{REF}$, generates significant harmonics for a received RF signal in a selected channel (STEP 400). This determination may be made empirically by measuring the sensitivity of each channel of a particular system, or computed for a particular system by analyzing the harmonics of the internal frequencies of the system relative to the frequencies of received channels. By way of example only, for a GSM cellular telephone system, the frequency ranges designated by the GSM standard for channel 5 is often subject to co-channel interference. The determination as to whether a reference frequency, $F_{REF}$, generates significant harmonics for a received RF signal in a selected channel can be implemented as a "look-up table" in a non-volatile memory device (e.g., ROM), or computed as needed from system parameters for a particular receiver implementation.

If the reference frequency, $F_{REF}$, does not generate significant harmonics for a received RF signal in a selected channel, then the standard reference frequency, $F_{REF}$, is used unchanged (STEP 402). However, if the contrary determination is made, then the reference frequency, $F_{REF}$, is varied or offset by a small amount, $\Delta F$, to derive an offset reference frequency $F'_{REF}$ (STEP 404). The offset $\Delta F$ may be plus or minus (that is, an increase or decrease in frequency), and may be implemented by suitable programming of the processor 109 to vary the control voltage Vo by a small amount, $\Delta V$, sufficient to achieve the desired amount of offset. In addition, the offset amount $\Delta F$ is chosen such that the same injection frequency synthesized from $F_{REF}$ can still be synthesized from $F_{REF} \pm \Delta F$ by shifting N by an integer amount, preferably to N+1 or N−1. As an example, if $F_{REF}$ is shifted to $F'_{REF} = F_{REF} + \Delta F$, then N is changed to N−1. If $F_{REF}$ is shifted to $F'_{REF} = F_{REF} - \Delta F$, then N is changed to N+1. However, the invention encompasses shifting N by other integer amounts.

The offset reference frequency $F'_{REF}$ results in an offset channel spacing frequency, $F'_{CH}$, and injection frequency, $N \cdot F'_{CH}$. The harmonics of the offset reference frequency, $F'_{REF}$, are shifted away from the frequency of the received RF signal, thus reducing co-channel interference.

Figure 5:
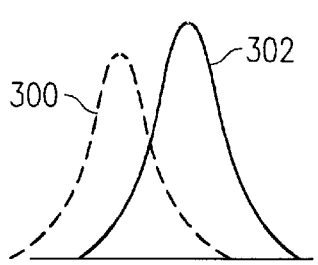
FIG. 5 is a diagram showing a harmonic of a reference frequency shifted relative to a received signal in accordance with the invention.

The $\Delta F$ offset should be large enough to shift the harmonics of the offset reference frequency $F'_{REF}$ sufficiently away from the frequency of the received RF signal to reduce co-channel interference. For example, FIG. 5 is a diagram showing a harmonic 300 of a reference frequency shifted relative to a received signal 302 in accordance with the invention. Shifting the interfering harmonic 300 by a small amount (e.g., one channel) substantially changes the amount of energy in the harmonic signal that coincides with the energy of the received signal 302.

Since the injection frequency should stay exactly the same for $F_{REF}$ and $F'_{REF}$, then $\Delta F$ should be chosen to meet the following criterion for a negative $\Delta F$ (the appropriate signs are reversed for a positive $\Delta F$):

$$(N+1) \cdot (F_{REF} - \Delta F) = N \cdot F_{REF}$$

For a negative $\Delta F$, the ratio of change in $F_{REF}$ is:

$$(F_{REF} - \Delta F)/F_{REF} = N/N+1 \approx (N-1)/N, \text{ since } N \text{ is large } (>>1000)$$

Suppose that there exists an undesired $M^{th}$ harmonic of $F_{REF}$ that is on the same frequency as the desired received signal (i.e., $M \cdot F_{REF} = N \cdot F_{CH}$). By shifting $F_{REF}$ to $F_{REF} - \Delta F$, its harmonics will also shift. The $M^{th}$ harmonic will now shift to $M \cdot F'_{REF} = M \cdot (F_{REF} - \Delta F)$. Since the ratio of change of $F_{REF}$ is approximately (N−1)/N, the undesired harmonic moves from $N \cdot F_{CH}$ to $N \cdot F_{CH} \cdot ((N-1)/N)$, which is (N−1) $\cdot F_{CH}$. The interference has thus moved one channel away, while the injection frequency is kept at the correct value to properly mix the received signal to a baseband frequency.

EXAMPLE

Assume that $F_{RFF} = 13$ MHz, R=65, $F_{CH} = 200$ KHz, N=4680, and $F_{RFC}$=the injection frequency =936 MHz. A problem arises because $F_{REF}$ has a harmonic at 936 MHz, which is 72·13 MHz. In accordance with the invention, $F_{REF}$ can be changed to $F_{REF} \cdot (N/N+1) = (13 \text{ MHz}) \cdot (4680/4681) = 12.99722$ MHz, and N can be changed to N+1=4681. The injection frequency remains equal to $N \cdot F_{CH} = N \cdot F_{REF}/R = 4681 \cdot 12.99722/65$ MHz=936 MHz. The harmonic moves to 72·12.99722 MHz=935.8 MHz, which is one channel (200 KHZ) away from the frequency, $F_{RFC}$, of the received signal.

Computer Implementation

Aspects of the invention may be implemented in hardware or software, or a combina-tion of both. However, preferably, the algorithms and processes of the invention are implemented in one or more computer programs executing on a programmable processor. Program code is applied to input data to perform the functions described herein and generate output information. The output information is applied to one or more outputs, in known fashion.

Each program may be implemented in any desired computer language (including machine, assembly, high level procedural, or object oriented programming languages) to communicate with a processing system. In any case, the language may be a compiled or interpreted language. Each such program is preferably stored on a storage media or device (e.g., ROM, CD-ROM, tape, or magnetic media) readable by a general or special purpose programmable processor, for configuring and operating the processor when the storage media or device is read by the processor to perform the procedures described herein. The inventive system may also be considered to be implemented as a computer-readable storage medium, configured with a computer program, where the storage medium so configured causes a processor to operate in a specific and predefined manner to perform the functions described herein.

A number of embodiments of the present invention have been described. Nevertheless, it will be understood that various modifications may be made without departing from the spirit and scope of the invention. For example, the concepts of the invention can be further generalized to use larger =66 F's along with changing (incrementing or decrementing) N by more than one (e.g., N±2, N±3, etc.) This would move the interference out by a corresponding number of channels. (However, requiring too large of a $\Delta F$ may require too great of a shift in the $F_{REF}$ generator to be practical.) Further, the invention works with any type of receiver exhibiting co-channel interference, including video signal receivers. Accordingly, other embodiments are within the scope of the following claims.

What is claimed is:

1. A method for improving the sensitivity of a radio frequency (RF) receiver at certain frequencies subject to co-channel interference, including the steps of:
   (a) determining that a reference frequency of the RF receiver generates significant interfering harmonic frequencies for a received RF signal in a selected channel;
   (b) generating an offset reference frequency based on such determination; and (c) changing a multiplier of the reference frequency used to generate an injection frequency such that the injection frequency synthesized from the offset reference frequency using the changed multiplier is approximately equal to the injection frequency synthesized from the reference frequency using the unchanged multiplier.

2. The method of claim 1 wherein determining that the reference frequency of the RF receiver generates significant interfering harmonic frequencies for the received RF signal in the selected channel further comprises measuring the sensitivity of each channel of the RF receiver.

3. The method of claim 1 wherein determining that the reference frequency of the RF receiver generates significant interfering harmonic frequencies for the received RF signal in the selected channel further comprises retrieving data from a look-up table.

4. The method of claim 1 wherein the RF receiver is an RF receiver for a GSM cellular telephone.

5. The method of claim 1 wherein changing the multiplier of the reference frequency used to generate the injection frequency further comprises changing the multiplier by an integer amount.

6. A method for improving the sensitivity of a radio frequency (RF) receiver at certain frequencies subject to co-channel interference, including the steps of:
   (a) determining that a reference frequency of the RF receiver generates significant interfering harmonic frequencies for a received RF signal in a selected channel;
   (b) generating an offset reference frequency based on such determination;
   (c) changing a multiplier of the reference frequency used to generate an injection frequency such that the injection frequency synthesized from the offset reference frequency using the changed multiplier is approximately equal to the injection frequency synthesized from the reference frequency using the unchanged multiplier;
   (d) determining that the reference frequency of the RF receiver does not generate significant interfering harmonic frequencies for a received RF signal in the selected channel; and
   (e) not offsetting the reference frequency and not changing the multiplier based on such determination.

7. An radio frequency (RF) receiver having improved sensitivity at certain frequencies subject to co-channel interference, including:
   (a) RF signal receiver circuitry for receiving an RF signal in a selected channel, and down converting and decoding the received RF signal to an information signal;
   (b) a reference frequency generator, coupled to the RF signal receiver circuitry, for generating a reference frequency for the RF signal receiver circuitry;
   (c) an injection frequency generator, coupled to the reference frequency generator, for multiplying the reference frequency by a multiplier to generate an injection frequency for down converting the RF signal receiver circuitry;
   (d) a determining element, coupled to the reference frequency generator, for indicating that the reference frequency generates significant interfering harmonic frequencies for a received RF signal in a selected channel; and
   (e) an offset generation element, coupled to the reference frequency generator and configured to respond to such indication from the determining element, for causing the reference frequency generator to generate an offset reference frequency and for changing the multiplier such that the injection frequency synthesized from the offset reference frequency using the changed multiplier is approximately equal to the injection frequency synthesized from the reference frequency using the unchanged multiplier.

8. The RF receiver of claim 7 wherein the the determining element comprises a sensitivity measuring element that measures the sensitivity of each channel of the RF receiver to determine whether the reference frequency generates significant interfering harmonic frequencies.

9. The RF receiver of claim 7 wherein the the determining element comprises a look-up table that stores previously calculated values of the interfering harmonic frequencies for each reference frequency.

10. The RF receiver of claim 7 wherein the RF signal receiver circuitry is GSM RF signal receiver circuitry.

11. The RF receiver of claim 7 wherein the reference frequency generator is a voltage controlled oscillator.

12. The RF receiver of claim 7 wherein the reference frequency generator is a voltage controlled crystal oscillator.

13. The RF receiver of claim 7 wherein the offset generation element changes the multiplier by an integer amount.

14. A computer program, residing on a computer-readable medium, for improving the sensitivity of a radio frequency (RF) receiver at certain frequencies subject to co-channel interference, the computer program comprising instructions for causing a programmable processor to:
   (a) determine that a reference frequency of the RF receiver generates significant interfering harmonic frequencies for a received RF signal in a selected channel;
   (b) generate an offset reference frequency based on such determination; and
   (c) change a multiplier of the reference frequency used to generate an injection frequency such that the injection frequency synthesized from the offset reference frequency using the changed multiplier is approximately equal to the injection frequency synthesized from the reference frequency using the unchanged multiplier.

15. The computer program of claim 14 wherein the instructions for causing the programmable processor to determine that the reference frequency of the RF receiver generates significant interfering harmonic frequencies for the received RF signal in the selected channel further comprise instructions for causing the programmable processor to measure the sensitivity of each channel of the RF receiver.

16. The computer program of claim 14 wherein the instructions for causing the programmable processor to determine that the reference frequency of the RF receiver generates significant interfering harmonic frequencies for the received RF signal in the selected channel further comprise instructions for causing the programmable processor to retrieve data from a look-up table.

17. The computer program of claim 14 wherein the instructions for causing the programmable processor to change the multiplier of the reference frequency further comprise instructions for causing the multiplier to change by an integer amount.

18. A computer program, residing on a computer-readable medium, for improving the sensitivity of a radio frequency (RF) receiver at certain frequencies subject to co-channel interference, the computer program comprising instructions for causing a programmable processor to:
   (a) determine that a reference frequency of the receiver generates significant interfering harmonic frequencies for a received RF signal in a selected channel;

(b) generate an offset reference frequency based on such determination;

(c) change a multiplier of the reference frequency used to generate an injection frequency such that the injection frequency synthesized from the offset reference frequency using the changed multiplier is approximately equal to the injection frequency synthesized from the reference frequency using the unchanged multiplier;

(d) determine that the reference frequency of the receiver does not generate significant interfering harmonic frequencies for a received RF signal in the selected channel; and (e) not offset the reference frequency and not change the multiplier based on such determination.

* * * * *